Dec. 25, 1951  F. S. ELSAESSER  2,580,008
MEANS FOR FORMING GROUND MEAT PATTIES
Filed April 12, 1947  3 Sheets-Sheet 2
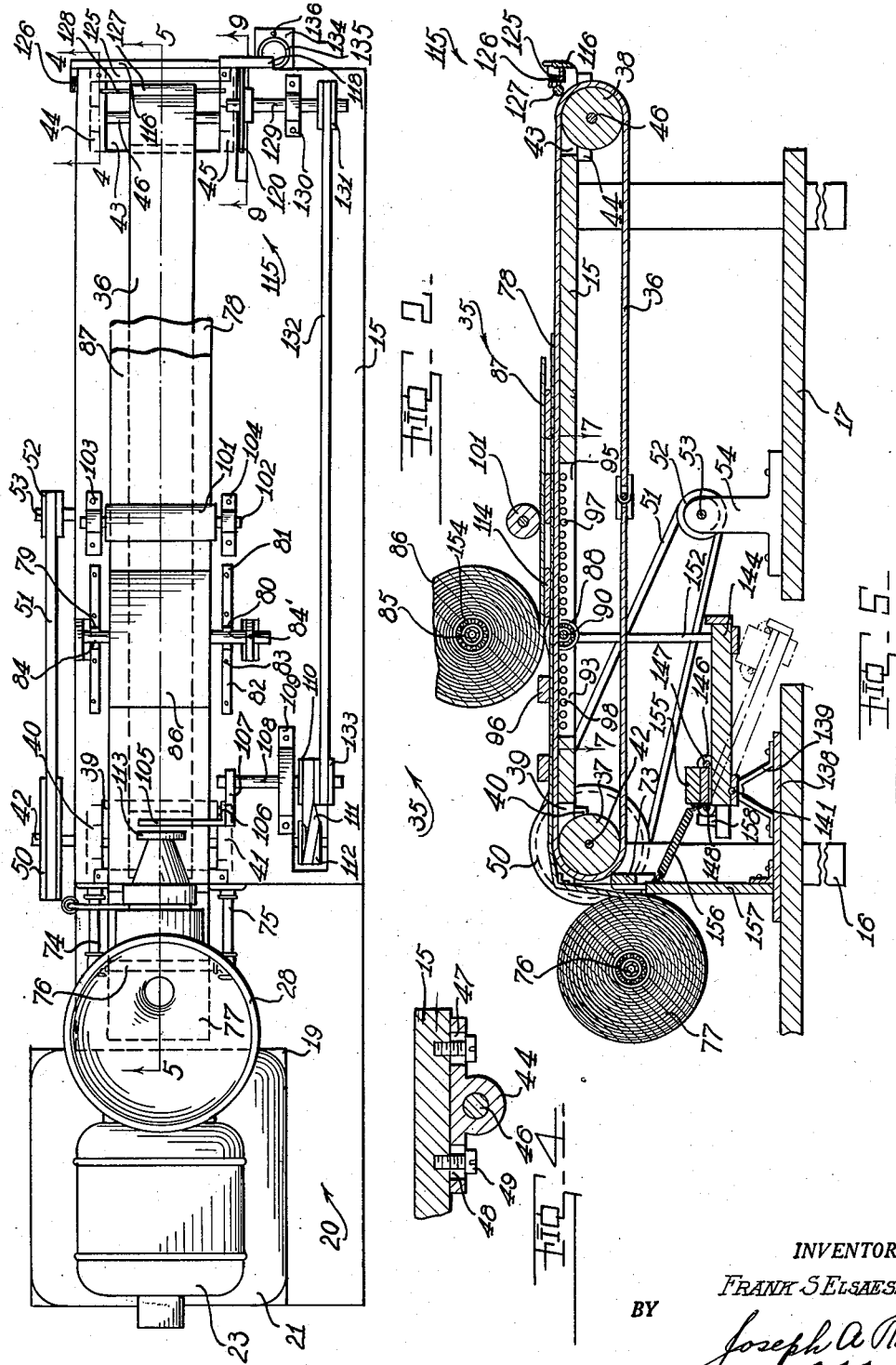
INVENTOR.
FRANK S ELSAESSER
BY
Joseph A Rave
Atty.

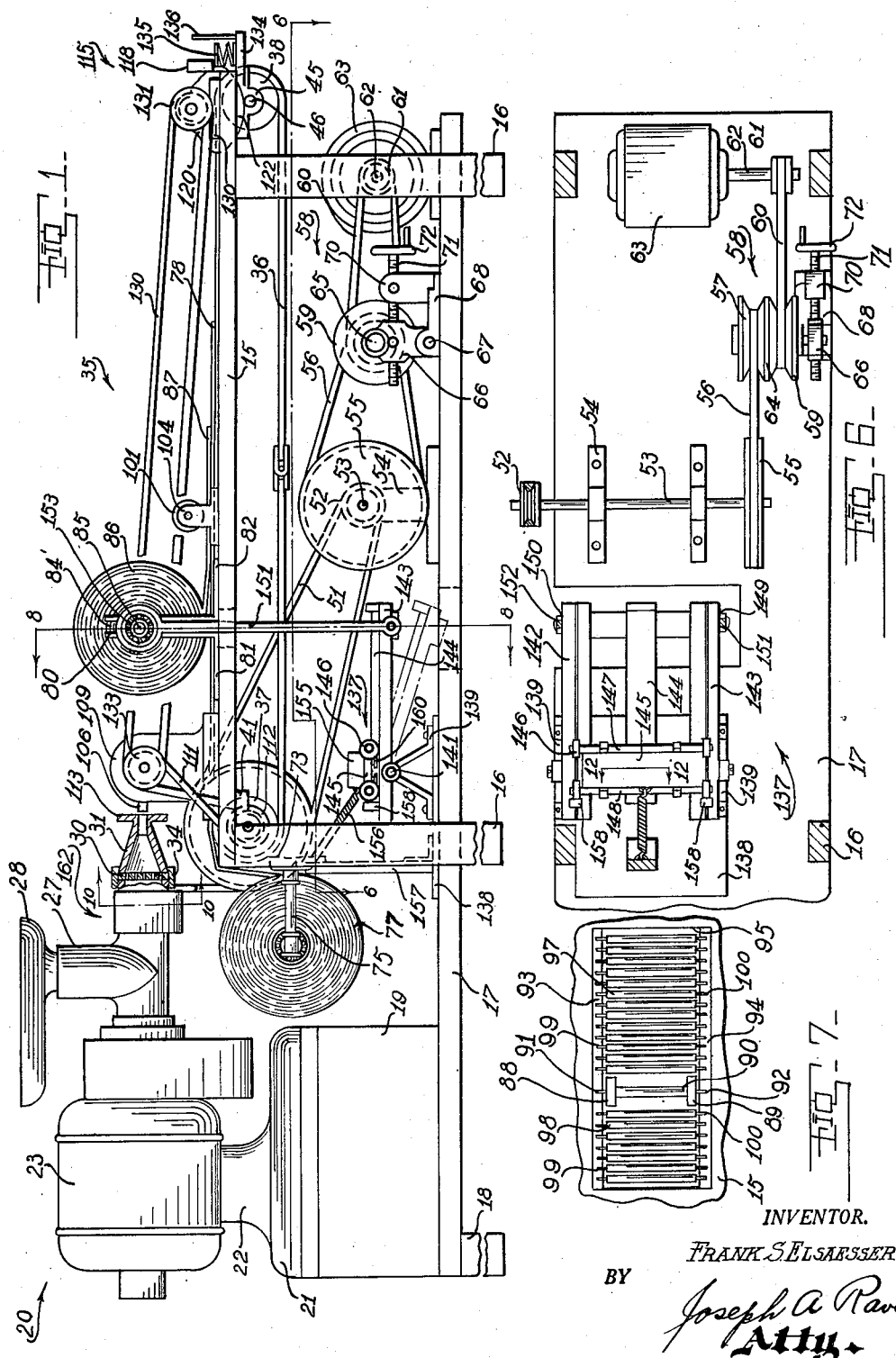

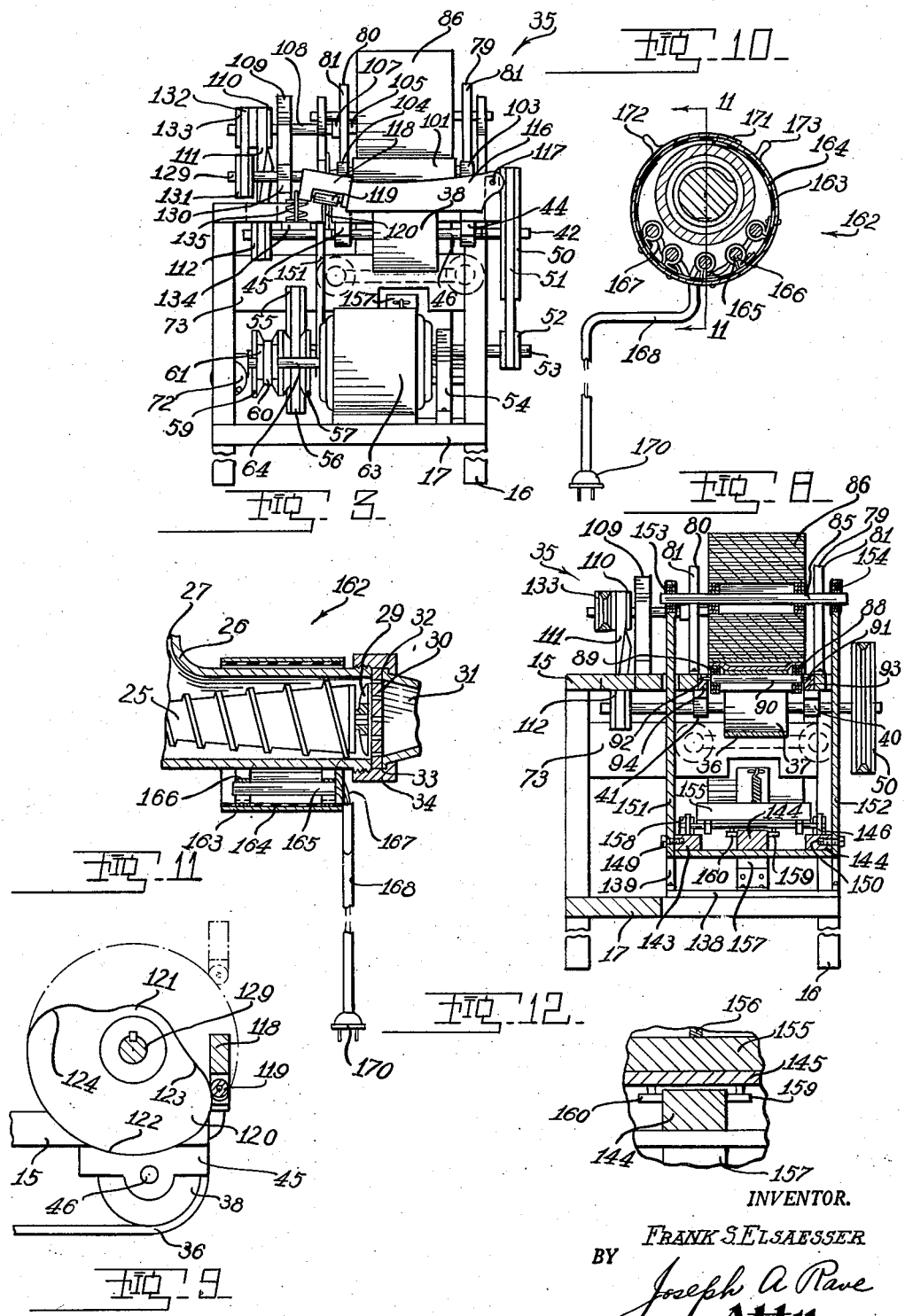

Patented Dec. 25, 1951

2,580,008

UNITED STATES PATENT OFFICE 2,580,008

MEANS FOR FORMING GROUND MEAT PATTIES

Frank S. Elsaesser, Cincinnati, Ohio

Application April 12, 1947, Serial No. 741,053

20 Claims. (Cl. 17—32)

This invention relates to improvements in means for forming ground meat patties, such for example, ground meat patties as used in Hamburg steaks and country sausage.

The means and method of the present invention is an improvement on the machine illustrated and described in applicant's co-pending application Serial No. 711,083 filed November 20, 1946, now Patent No. 2,546,497, March 27, 1951.

The machine of the present invention will find its principal use in packing houses and restaurants which furnish and use large quantities of ground meat patties.

The principal object of the present invention is the provision of a machine which is substantially automatic in its operation, after the meat has been introduced into the meat grinder, in the production of ground meat patties.

Another object of the present invention is the provision of a ground meat patty forming machine utilizing underlying and cover papers for each patty and which paper is taken directly from rolls of paper and automatically severed between the ground meat patties after the formation thereof.

Another object of the present invention is the provision of a ground meat patty forming machine in which the covering paper is unreeled from a roll as used and wherein the said paper roll is utilized as a masher or flattener in the formation of said ground meat patties.

A still further object of the present invention is the provision of a ground meat patty forming machine in which the patties are provided with a covering paper unreeled from a roll as the patties are formed and in which the paper roll itself is utilized to effect the major mashing or flattening of the patties and in which a subsequent flattener is employed to effect the final flattening and sizing of the ground meat patties.

A still further object of the present invention is the provision of a ground meat patty forming machine in which a covering paper for the patties is employed unreeled from a roll which when full has sufficient weight to mash or flatten the patties to the desired thickness together with means for compensating for the loss of weight in the paper roll as it is diminished in size due to use.

It has been found that when ground meat is cold, below approximately 40° F., it considerably resists mashing or flattening thereby requiring considerable additional weight and power to flatten the ground meat into patties.

It is, therefore, a further object of this invention to provide means for elevating the temperature of the meat just prior to the mashing or flattening thereof into a patty thereby reducing the resistance in the ground meat to flattening and enabling an easier operation of the machine.

It is also an additional and specific object of the present invention to provide a ground meat patty forming machine in which ground meat portions are passed beneath a mashing roller with anti-friction means in opposition to the roller thereby assisting in the mashing or flattening of the ground meat quantities to patties.

It is also an object of this invention to provide an improved method of forming ground meat patties whereby they may be expeditiously produced regardless of the temperature of the meat as it passes into the grinder.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a front elevational view of a ground meat patty forming machine embodying the improvements of this invention.

Fig. 2 is a top plan view of the machine as illustrated in Fig. 1.

Fig. 3 is an end elevational view of the machine illustrated in Figs. 1 and 2 as seen particularly from the right hand end thereof.

Fig. 4 is an enlarged fragmentary sectional view through one of the drum bearings as seen from line 4—4 on Fig. 2.

Fig. 5 is a longitudinal sectional view through the patty forming machine as seen from line 5—5 on Fig. 2.

Fig. 6 is a fragmentary plan view of a portion of the machine with certain portions in cross section, said view being taken on line 6—6 on Fig. 1.

Fig. 7 is a fragmentary plan view of a portion of the machine as seen particularly from line 7—7 on Fig. 5.

Fig. 8 is a vertical sectional view through the machine particularly the covering paper roll and its supporting and weight compensating mechanisms as seen from line 8—8 on Fig. 1.

Fig. 9 is an enlarged fragmentary sectional view showing certain parts in elevation as seen particularly from line 9—9 on Fig. 2.

Fig. 10 is an enlarged transverse sectional view through the improved discharge end of the meat grinder as seen from line 10—10 on Fig. 1.

Fig. 11 is a fragmentary vertical sectional view through the discharge end of the meat grinder taken on line 11—11 on Fig. 10.

Fig. 12 is an enlarged fragmentary sectional view of a portion of the paper roll weight compensating device as seen from line 12—12 on Fig. 6.

Throughout the several views of the drawings similar reference characters are employed to denote the same or similar parts.

The ground meat patty forming machine of the present invention comprises a table 15, supported by suitable legs or supports 16. Beneath the table 15 is a shelf 17 which extends rearwardly of the table 15 and which shelf is in part supported by the legs or supports 16 and in part by additional legs or supports 18. The frame or support just described may vary but makes possible a convenient self-contained machine.

Mounted on the rearward extension of the shelf 17 is a supporting block 19 carrying the meat grinder indicated in general by the reference numeral 20. The meat grinder 20 comprises a base 21 from which upstands a pedestal 22 having integral therewith or secured thereto a motor 23. The motor 23 through gears in a gear box 24 drives a feed screw 25, see Fig. 11, which is rotatably mounted in the meat grinder housing 26. The housing 26 is provided with a feeding funnel or neck 27 supporting at its upper end a tray 28.

Meat to be ground is delivered to the tray 28 for deposition into the funnel or filling neck 27 and thereby to the grinder housing 26. The feed screw 25 forces the meat to be ground past a cutter or comminuter 29 from which the meat is forced through the perforated plate 30 at the forward end of the grinder body 26. Extending from the perforated plate 30 is the delivery nozzle 31 illustrated as contracting toward its forward or free end. The nozzle 31 is provided at its inner or rear end with a radial flange 32 adapted to be disposed beneath an inwardly projecting radial flange 33 on a clamping nut 34. The nut 34 is employed for securing the nozzle 31 and comminuting perforated plate 30 to the end of the ground meat housing 26 in operative relation to the grinder knife.

The ground meat is ejected from the meat grinder through the nozzle 31 and severed into desired portions for providing a ground meat patty of the desired weight and size. The said severed portions are formed into a patty by the patty forming machine indicated in its entirety by the reference numeral 35 and which machine forms the subject matter of the present invention.

Disposed on the upper surface of the table 15 is a conveyor belt 36 which extends about a pulley or drum 37 at the rear end of the machine as well as about a pulley or drum 38 at the forward end of the machine. The pulley or drum 37 is mounted to have the upper surface of the table 15 tangent thereto and as shown in Fig. 5 is disposed in a recess or cutout 39 in the rear end of the table 15. Secured to the undersurface of the table 15 adjacent the edges of the cutout 39 are bearings 40 and 41 in which is journaled a shaft 42 that has secured thereto the pulley or drum 37. The pulley or drum 38 is likewise mounted in a cutout or recess 43 in the forward end of the table 15 and the said recess 43 is flanked by bearings 44 and 45 secured to the undersurface of the table 15. Disposed in the bearings 44 and 45 is a shaft 46 to which is keyed or otherwise secured the pulley or drum 38. As illustrated in Fig. 4 each of the bearings 44 and 45 is provided with an elongated aperture 47 and 48 through which extends bearing mounting bolts or screws 49. The purpose for this construction is to permit the movement of the pulleys or drums 37 and 38 outwardly of one another to take up stretch in the transmission belt 36.

The transmission belt 36 is adapted to be constantly actuated for which purpose the pulley or drum 37 is driven and may be designated the conveyor belt driving drum while the pulley or drum 38 may be designated the idler. In order to drive the pulley or drum 37 it has its shaft 42 projecting beyond the bearing 40 to have secured thereto a pulley 50 about which is trained a belt 51. The belt 51 is in turn trained about a pulley 52 secured to one end of a countershaft 53. The countershaft 53 is suitably mounted by a bracket 54 upstanding from the shelf 17 and the countershaft 53 has secured thereto a second pulley 55. It will be noted that the pulleys 52 and 55 are of dissimilar diameter and therefore act as a speed changer between the conveyor belt driving drum 37 and the motor power to be subsequently pointed out.

Extending about the pulley 55 is a belt 56 which also extends about a pulley 57 of a speed variator indicated in general by the reference numeral 58. The speed variator is in turn connected through a second pulley 59 thereof and belt 60 with a pulley 61 on shaft 62 of motor 63.

The speed variator 58 is of a well known variety and its pulleys 57 and 59 have a common side 64 which is adapted to be shifted either toward the pulley 57 or the pulley 59 for thereby changing the operative dimension of said pulleys to vary the R. P. M. between the countershaft 53 and motor shaft 62. In order to effect this shifting of pulley side 64 use is made of a shaft 65 on which is fixed the pulleys 57 and 59 while the pulley side 64 slides relative thereto. The shaft 65 is carried by oscillatable arm 66 pivotly mounted at 67 to the base plate 68 of speed variator 58. Upstanding from the base plate 68 is a post 70 in which is mounted a bearing to permit rotation of adjusting screw 71 threaded into a nut oscillatably carried by the oscillatable arm 66. In order to actuate the adjusting screw 71 there is secured to its outer end a handle wheel 72.

From the foregoing it will be appreciated that the conveyor belt 36 may be actuated at various speeds for a purpose that will subsequently be made clear.

Secured to the inner end of the patty forming machine 35, such for example transverse brace 73, and projecting rearwardly thereof are arms 74 and 75 in the outer ends of which is journaled a shaft 76 for supporting a roll 77 of treated paper and which treated paper extends from the roll 77 to lie on the upper reach of the conveyor belt 36 and which paper layer is indicated by the reference numeral 78.

Mounted on to extend from the upper surface of the table 15 are guides 79 and 80 with said guides located one on each side of the conveyor belt 36. Each of the guides 79 and 80 is formed of a pair of angle irons 81 and 82 with said angle irons each having a leg secured to the table 15 as by screws 83 and each of the angle irons having its other leg upstanding normal to the table 15 and in opposition to one another to thereby provide a vertical guiding slot 84 in the guide 79 and guiding slot 84' in the guide 80. Disposed in the guiding slots 84 of the guides 79 and 80 is a shaft or axle 85 on which is mounted a roll of prepared paper 86. The paper from the roll 86 may be designated as the covering paper for the ground meat patties to be subsequently produced and said paper layer is indicated in the drawings by the reference numeral 87.

The paper roll 86, directly beneath its shaft or axle 85, overlies and is spaced from the conveyor 36 as well as the paper layer 78 thereon. This spacing of the paper roll 86 is effected by the engagement of the periphery of the roll, at the extreme edges thereof, with anti-friction rollers 88 and 89. The rollers 88 and 89 are carried by a shaft or spindle 90 which has pin bearings 91 and 92 projecting from its ends and received in suitable bearing slots in races 93 and 94. The races 93 and 94 are secured to the table 15 along the longitudinal edge of an opening 95 formed in the table immediately below the paper roll 86 and which opening 95 extends forwardly as well as rearwardly of the paper roll 86 for a purpose that will presently be made clear.

The shaft or spindle 90 which supports the roller bearings 88 acts, in addition, as an anti-friction roller in opposition to the paper roll 86 for flattening or mashing the ground meat patty as the said ground meat passes between the same and the opposed paper roll. As will be seen from Fig. 5, and due to the fact of the circumference of the paper roll 86, the ground meat portions 96 will be partially mashed before the said ground meat portion is mashed to final size. To assist in this mashing and reduce resistance there is provided a plurality of anti-friction rollers 97 rearwardly of the spindle-roller 90 as well as a plurality of anti-friction rollers 98 forwardly of said spindle-roller 90. As seen in Fig. 7 each of the anti-friction rollers 97 and each of the anti-friction rollers 98 is respectively provided with projecting pin bearings 99 and 100 respectively received in slots in the bearing races 93 and 94 which flank the sides of the table opening 95.

While the paper roll 86 itself, and particularly when full, will effect the desired mashing or flattening of the ground meat portions to the desired patty thickness, there is provided an additional flattener or masher which conveniently takes the form of a roller or drum 101. As seen in Fig. 2 the roller 101 is provided with a shaft 102 which projects beyond each end thereof to be journaled in bearings 103 and 104 secured to and upstanding from the table 15. As seen in Fig. 5 the flattener or masher roller 101 is located above one of the anti-friction rollers 98 to cooperate therewith in forming a throat of the final or desired size. It will further be noted that certain of the anti-friction rollers is disposed between the flattening roller 101 and the paper roll 86 while that certain additional anti-friction roller 98 projects forwardly of the flattening roller 101.

It should be noted that the anti-friction rollers 97 and 98 as well as the spindle-roller 90 are so mounted that their uppermost point is in the plane of the upper surface or top of the table 15. In other words the said upper surface of the table 15 is tangent to the rollers 97 and 98. It will further be noted that the anti-friction surface provided by the rollers 97 and 98 extends well rearwardly and forwardly of the masher throat formed below the paper roll 86 and the auxiliary masher throat formed below the flattener or masher roller 101, thereby materially assisting in conveying the ground meat portions to, through and beyond the said masher throats during the mashing or flattening of the ground meat portions.

In the operation of the machine ground meat is being constantly extruded through the nozzle 31 and is severed to provide the ground meat portions 96. Any suitable or desirable means may be employed for this purpose and which means may, for example, take the form of that illustrated in the drawings.

As shown in the drawings the means for dividing or severing the ground meat into portions 96 from the extruded stream comprises a knife 105 having its one end up set as at 106 for attachment to an arm 107 keyed or otherwise secured to a shaft 108. The shaft 108 is rotatably mounted in a bearing 109 and projects beyond the bearing to have secured thereto a pulley 110 through which the shaft 108 and knife 105 are actuated. Extending about the pulley 110 is a belt 111 which in turn extends about a pulley 112 secured to the drum shaft 42 and which drum shaft 42 extends from the drum or pulley 37 for this purpose. As will be seen in Figs. 1 and 2 the belt 111 is twisted since the knife shaft 108 must rotate in a counter-clockwise direction while the drum 37 rotates in a clockwise direction.

In order to prevent interference between the knife 105 and nozzle 31 and assist in the dividing or severing of the ground meat portion 96 from the stream the said nozzle 31 is provided at its outlet end with a flange 113 to act as a guard for the knife 105.

The ground meat portions 96 upon being severed or divided from the stream extruding from the nozzle 31 fall onto the paper layer 78 from the paper roll 77 and each portion 96 is of sufficient weight to press the said paper layer 78 onto the conveyor belt 36 which is constantly moving, immediately carries the ground meat portion forwardly on the table 15. As soon as the ground meat portion 96 comes into contact with the paper roll 86, due to the inherent stickiness of the ground meat, it immediately picks up the paper layer 87 and effects an unwinding of said paper layer 87 from the paper roll 86 as the ground meat portion 96 pass along the table 15.

As was noted above a full paper roll 86 has sufficient weight, under normal conditions, to flatten the ground meat portion 96 into a patty indicated in Fig. 5 by the reference numeral 114. The said patty 114 along with the underlying paper layer 78 and covering paper layer 87 now move as a unit, being actuated by the conveyor belt 36, and pass beneath the masher roller or drum 101 to further reduce the patty 114 in thickness, if necessary or desirable. It will be understood that the dividing or cutting knife 105 is constantly operating and provides a ground meat portion 96 for each rotation thereof and that there is provided between each ground meat portion 96 an air space caused by the time interval between each passage of the knife 105 relative to the nozzle 31. The patties with their underlying paper and covering paper are actuated in a continuous stream toward the forward or discharge end of the machine where the patties are separated from one another by cutting through the underlying paper 78 and covering paper 87 by a paper cutting mechanism indicated in general by the reference numeral 115.

Any suitable or desirable means may be employed for effecting this severing or cutting of the patties from one another such for example as illustrated in the drawings. The severing or cutting mechanism 115 comprises a paper knife or knife blade 116 suitably pivoted at 117 to the remote forward corner of the table 15. The knife blade 116 is of sufficient length to cut entirely across the paper layers 78 and 87, and has considerable weight for a purpose that will later be made clear. Forwardly of the blade 116 it is provided with a raising head 118 which includes a roller 119. The roller 119, see Figure 9, is adapted to be engaged by a cam 120 which thereby effects a raising of the blade. As seen in Fig. 9, the cam 120 is provided with a low arcuate portion 121 and a high arcuate portion 122 with said portions joined at one end by a rising cam portion 123 and joined at the other end by a declining or step off portion 124.

In operation the cam 120 through its rising portion 123 raises the knife blade 116 from the solid line position of Figs. 3 and 9 to the dotted line position in said figures. The knife blade is held in the raised or dotted line position by the high arcuate cam portion 122 until the step off 124 is reached whereupon the knife falls by gravity to the solid line position. The time consumed by the knife blade 116 in falling from the dotted line position to the solid line position permits the rotation of the cam 120 through the arc of its low arcuate cam portion 121 so that, substantially, as soon as the knife blade reaches the solid line position of Fig. 9 the lifting or rising portion 123 of the cam is ready to lift the blade to its upper or dotted line position.

The knife blade 116, see Fig. 2, operates relative to a fixed cutter blade 125 which spans the opening 43 in the forward end of the machine. In order to insure the proper operation of the knife blade 116 relative the fixed blade 125 use is made of a spring 126 to hold the blades yieldably to one another so that the keen edge of the moveable knife blade has a shearing action with respect to the operating edge of the fixed blade 125.

As was noted above the knife blade 116 even though substantially immediately raised from its lowermost or cut off position does consume sufficient time to momentarily interrupt the continuous movement of the patties with the belt 36 thereby tending to pile up the patties behind the blade. This retarding of the movement of the patties is merely momentary and is substantially immediately rectified upon the raising of the cut-off blade 116. In order to assist in this rectification and permit a continuous flow of the patties use is made of a roller 127 located between the fixed blade 125 and end of the conveyor belt 36, as illustrated in Fig. 2 the roller 127 has a shaft 128 projecting beyond the ends thereof and journaled in suitable notches in the sides of the opening 43.

As was noted above the knife blade operating cam 120 is rotated for which purpose it is keyed or otherwise secured to one end of a shaft 129 rotatably mounted in a bearing 130 secured to and upstanding from the table 15. In order to rotate the shaft 129 it has keyed or otherwise secured thereto, on the other side of the bearing 130, a pulley 131 about which is trained a belt 132. The belt 132, in turn is trained about a pulley 133 secured to the ground meat cutting or severing knift shaft 108. As was noted above the paper cut-off knife blade 116 has considerable weight which is utilized to cause the knife to cut or sever the underlying paper 78 and the covering paper 87 between adjacent ground meat patties. In order to position the knife when in its cut-off position use is made of a stop or positioning member and at the same time this stop or positioning member acts as a buffer to take the final blow of the falling knife and yieldably bring the same to rest. This positioning member may take the form of a ledge 134 secured to and projecting forwardly of the table 15, on which is secured to upstand therefrom a compressible coil spring 135. Since the coil spring 135 has its upper end free and in order to retain the spring in position to be engaged by the knife, particularly the operating head 118, a spring guide 136 is provided to upstand from the ledge 134.

A full roll of paper 86 has sufficient weight to effect the flattening or mashing of the ground meat portions 96 to a patty 114. It will be appreciated that as the paper 87 is unrolled or unreeled the weight thereof will decrease and in order that the paper roll 86 may be continuously used as a masher this decrease in weight must be compensated for. The compensation for this weight may be effected by any suitable or desirable means such for example as illustrated in the drawings and indicated in general by the reference numeral 137.

The weight compensating means 137 comprises a base 138 intermediate the ends of which upstand bearing members 139 having journaled therein a shaft 141. The shaft 141 has secured thereto a platform comprising longitudinal track members 142 and 143 together with a central guide member 144. Mounted on the platform tracks 142 and 143 is a miniature cart 145 having at its four corners wheels 146 which conveniently take the form of anti-friction rollers carried by axles 147 and 148 respectively at the front and back of the cart 145. The forward end of the platform has pivoted to it at its opposite corners at 149 and 150 respectively, arms or links 151 and 152. The arms or links 151 and 152 are respectively, provided at their upper end with anti-friction bearings 153 and 154 in which is journaled the shaft 85 of the paper roll 86.

With a full roll of paper 86 the platform is arranged to be substantially horizontal as illustrated in Figs. 1 and 5 with the cart 145 substantially directly above the platform axle 141. Mounted on the cart 145 is a weight 155 which is substantially equal to the weight of a full paper roll 86. As the paper roll 86 decreases in diameter and loses weight it descends through the guides 79 and 81 in order that its lowermost edge may remain in contact with the positioning anti-friction rollers 88 and 89. As the said paper roll 86 descends the links 151 and 152 force the forward end of the platform downwardly thereby effecting an inclination in the tracks 142 and 143 which causes the cart 145 to roll or move toward the free end of the platform. The final inclination of the platform is illustrated in phantom lines in Fig. 5.

It will be understood that the weight 155 acting on the platform when in the solid line position of Fig. 5 adds substantially nothing to the pull of the platform on the paper roll while as the weight 155 advances to various positions between the axle 141 and free end of the platform it adds a proportion of its weight on the platform arms or links 151 and 152 and thereby adds this weight to that of the diminishing weight of the paper roll 86. The weight 155 and cart 145 are to be adjusted on the platform in the proportion of weight loss in the paper roll 86 as it is being unrolled or unreeled until the paper roll is substantially exhausted at which time the cart 145 and its weight 155 are at the extreme end of the platform and supplying to the paper roll 86 the full mashing or flattening weight originally supplied by the said paper roll 86 itself.

In order to prevent the cart 145 and its weight 155 from running to the end of the platform upon a slight tilting thereof, use is made of a hold back spring 156 which has one end secured to the cart 145 and has its other end secured to a post 157 upstanding from the weight compensator base 138. In order to limit and properly position the cart 145 at the rear end of the platform the tracks 142 and 143 have upstanding therefrom abutments 158 to engage the cart wheels or rollers 146.

To control the lateral position of the cart 145 and its weight 155 relative to the platform the said cart 145 has depending from its under surface lateral guiding anti-friction rollers 159 and 160 which respectively engage the sides of the guide 144.

Ground meat whether used in making of Hamburg steak patties or country sausage patties has a certain amount of fat and is frequently at a comparatively low temperature when introduced into the grinder funnel or throat 27. It has been found that the fat collects on the sides of the grinder housing 26 thereby interfering with the smooth and continuous flow of ground meat from the nozzle 31. Furthermore at this temperature, approximately 40° F. and below, the cold meat and fat are quite rigid and seem to resist flattening or mashing except under pressure which is not required in ground meat ten and more degrees warmer. The interference with the flow of the ground meat from the nozzle 31 results in quantities of meat of different or varying weights and therefore ground meat patties that are not uniform in area since they have different weight. It has been found that by heating the ground meat as it passes through the grinder body 26 the tendency to deposite fat on the sides thereof is materially reduced so that a uniform flow of ground meat from the nozzle 31 may be maintained and furthermore the meat seems to be softer wherefor it can more readily be mashed or flattened. Any suitable or desirable means may be employed for effecting the heating of the meat within the grinder body 26 and there is disclosed in the drawings a simple electric heater indicated as a whole by the reference numeral 162.

Specifically, the heating mechanism 162 comprises an outer shell 163 of metal, having a limited amount of resilience and provided interiorly with a heat insulating liner 164. Secured within the shell and liner are a plurality of heating elements 165 held in place by brackets 166 secured to the liner and the shell in any suitable or desirable manner. The wires 167 from the heating elements 165 are connected to an electric cord 168 which terminates in the usual pronged plug 170 for connection to an electric outlet.

The electric heater 162 is so designed that it may be readily removed from the grinder body 26 so that said grinder body can be suitably washed and cleaned after each use as is customary. In order to permit the removal of the electric heater 162 the casing or outer shell 163 has its ends 171 telescoped in such a manner to permit the separating thereof during the removal of the heater and in order to separate the said casing ends 171 it is provided with suitable knobs 172 and 173, one located on each side of the said telescope ends 171.

The operation of the ground meat patty forming machine was described as the parts thereof were identified and it is believed that the said operation is well understood. It should be noted however that the meat grinder 20 produces ground meat through the nozzle 31 at substantially a continuous rate which results in ground meat portions 96 being of substantially the same weight since the meat cutting or severing knife 105 severs or divides the stream at regularly spaced intervals. Since the knife is driven from a source of power independent of the grinder source of power the rate of operation of the meat cutting or severing knife 105 may be changed with respect to the rate of operation of the grinder and thereby change the weight of the ground meat portions 96 and thereby change the size of the ground meat patties 114. In order to do this the variable speed device 58 is adjusted to increase or decrease the rate of rotation of the shaft 42 thereby either increasing the rate of operation of the knife 109 or decreasing its rate of operation to cause the ground meat portions 96 to be larger or smaller. Since the conveyor belt 36 and paper cut-off knife blade 116 are each operated from the shaft 42 they would be kept in unison with the operation of the said knife 105 regardless of the ratio of rotation of the said meat cutting or severing knife 105 to the operation of the meat grinder motor 23.

From the foregoing it is now believed evident that there has been provided a ground meat patty forming machine that accomplishes the objects initially set forth.

What is claimed is:

1. In a ground meat patty forming machine the combination of a supporting table, a conveyor belt on said table movable relative thereto, a ground meat patty underlying paper layer on said conveyor belt movable with said conveyor belt, a paper roll at the end of the table for supplying said underlying paper layer, means for placing quantities of ground meat, each ground meat quantity sufficient to provide a patty, on the underlying paper layer and spaced from one another to provide a spacing between the patties, a second paper roll upstanding from said table supplying a covering paper for each portion of ground meat and the patty formed therefrom, means associated with the table supporting the bottom edge of the covering paper roll above the underlying paper layer and conveyor belt a distance equal to the desired thickness of the subsequently formed ground meat patty and said covering paper roll effecting the flattening or mashing of the ground meat portions into patties as the ground meat portions pass successively therebeneath, and a roller carried by the table in opposition to the covering paper roll cooperating therewith in effecting the mashing or flattening of the ground meat portions to ground meat patties as the ground meat portions successively pass beneath the said covering paper roll.

2. In a ground meat patty forming machine the combination of a supporting table, a conveyor belt on said table movable relative thereto, a ground meat patty underlying paper layer on said conveyor belt movable with said conveyor belt, a paper roll at the end of the table for supplying said underlying paper layer, means for placing quantities of ground meat, each ground meat quantity sufficient to provide a patty, on the underlying paper layer and spaced from one another to provide a spacing between the patties, a second paper roll upstanding from said table supplying a covering paper for each portion of ground meat and the patty formed therefrom, means associated with the table supporting the bottom edge of the covering paper roll above the underlying paper layer and conveyor belt a distance equal to the desired thickness of the subsequently formed ground meat patty and said covering paper roll effecting the flattening or mashing of the ground meat portions into patties as the ground meat portions pass successively therebeneath, a roller carried by the table in opposition to the covering paper roll cooperating therewith in effecting the mashing or flattening of the ground meat portions to ground meat patties as the ground meat portions successively pass beneath the said covering paper roll, and anti-friction rollers rearwardly and forwardly of the said masher or flattener roller for supporting the conveyor belt, underlying paper layer and ground meat patties as they are conveyed to and forwardly of the covering paper roll.

3. In a ground meat patty forming machine the combination of a supporting table, a conveyor belt on said table movable relative thereto, a ground meat patty underlying paper layer on said conveyor belt movable with said conveyor belt, a paper roll at the end of the table for supplying said underlying paper layer, means for placing quantities of ground meat, each ground meat quantity sufficient to provide a patty, on the underlying paper layer and spaced from one another to provide a spacing between the patties, a second paper roll upstanding from said table supplying a covering paper for each portion of ground meat and the patty formed therefrom, means associated with the table supporting the bottom edge of the covering paper roll above the underlying paper layer and conveyor belt a distance equal to the desired thickness of the subsequently formed ground meat patty and said covering paper roll effecting the flattening or mashing of the ground meat portions into patties as the ground meat portions pass successively therebeneath, an auxiliary masher or flattening drum carried by the table having its bottom edge upwardly spaced from the underlying paper layer and conveyor belt a distance substantially equal to the patty thickness, and a roller carried by the table beneath each of the covering paper roll and auxiliary mashing or flattening drum cooperating with one another in mashing or flattening successive ground meat portions to ground meat patties.

4. In a ground meat patty forming machine the combination of a supporting table, a conveyor belt on said table movable relative thereto, a ground meat patty underlying paper layer on said conveyor belt movable with said conveyor belt, a paper roll at the end of the table for supplying said underlying paper layer, means for placing quantities of ground meat, each ground meat quantity sufficient to provide a patty, on the underlying paper layer and spaced from one another to provide a spacing between the patties, a second paper roll upstanding from said table supplying a covering paper for each portion of ground meat and the patty formed therefrom, means associated with the table supporting the bottom edge of the covering paper roll above the underlying paper layer and conveyor belt a distance equal to the desired thickness of the subsequently formed ground meat patty and said covering paper roll effecting the flattening or mashing of the ground meat portions into patties as the ground meat portions pass successively therebeneath, an auxiliary masher or flattening drum carried by the table having its bottom edge upwardly spaced from the underlying paper layer and conveyor belt a distance substantially equal to the patty thickness, a roller carried by the table beneath each of the covering paper roll and auxiliary mashing or flattening drum cooperating with one another in mashing or flattening successive ground meat portions to ground meat patties, and rollers carried by the supporting table rearwardly of the covering paper roll cooperating roller, forwardly of the auxiliary masher or flattening drum cooperating roller and between said covering paper roll and auxiliary masher or flattener drum cooperating rollers whereby an anti-friction supporting surface is supplied for the conveyor belt, underlying paper layer and ground meat portions as they are brought to and passed through the masher throat.

5. In a ground meat patty forming machine the combination of a supporting table, a conveyor belt on said table movable relative thereto, a ground meat patty underlying paper layer on said conveyor belt movable with said conveyor belt, a paper roll at the end of the table for supplying said underlying paper layer, means for placing quantities of ground meat, each ground meat quantity sufficient to provide a patty, on the underlying paper layer and spaced from one another to provide a spacing between the patties, a second paper roll upstanding from said table supplying a covering paper for each portion of ground meat and the patty formed therefrom, means associated with the table supporting the bottom edge of the covering paper roll above the underlying paper layer and conveyor belt a distance equal to the desired thickness of the subsequently formed ground meat patty and said covering paper roll effecting the flattening or mashing of the ground meat portions into patties as the ground meat portions pass successively therebeneath, said covering paper roll when full having sufficient weight for effecting the flattening or mashing of ground meat portions to ground meat patties, said covering paper roll being diminished in weight as the same is unrolled to supply covering paper to successive ground meat patties, and means for compensating for the covering paper roll weight loss in direct proportion to said loss.

6. In a ground meat patty forming machine the combination of a supporting table, a conveyor belt on said table movable relative thereto, a ground meat patty underlying paper layer on said conveyor belt movable with said conveyor belt, a paper roll at the end of the table for supplying said underlying paper layer, means for placing quantities of ground meat, each ground meat quantity sufficient to provide a patty, on the underlying paper layer and spaced from one another to provide a spacing between the patties, and a second paper roll upstanding from said table supplying a covering paper for each portion of ground meat and the patty formed therefrom, means associated with the table supporting the bottom edge of the covering paper roll above the underlying paper layer and conveyor belt a distance equal to the desired thickness of the subsequently formed ground meat patty and said covering paper roll effecting the flattening or mashing of the ground meat portions into patties as the ground meat portions pass successively therebeneath, said covering paper roll when full having sufficient weight for effecting the flattening or mashing of ground meat portions to ground meat patties, said covering paper roll being diminished in weight as the same is unrolled to supply covering paper to successive ground meat patties, and means for compensating for the covering paper roll weight loss in direct proportion to said loss, comprising a weight equal to the weight of a full covering paper roll, and a pivotly mounted lever having its one end pivoted and its other end connected to the covering paper roll and supporting said weight at points on said lever determined by the weight of the roll and whereby the effective length of the lever forwardly of the pivot is inversely proportioned to the weight of the covering paper roll.

7. In a ground meat patty forming machine the combination of a supporting table, a conveyor belt on said table movable relative thereto, a ground meat patty underlying paper layer on said conveyor belt movable with said conveyor belt, a paper roll at the end of the table for supplying said underlying paper layer, means for placing quantities of ground meat, each ground meat quantity sufficient to provide a patty, on the underlying paper layer and spaced from one another to provide a spacing between the patties, a second paper roll upstanding from said table supplying a covering paper for each portion of ground meat and the patty formed therefrom, means associated with the table supporting the bottom edge of the covering paper roll above the underlying paper layer and conveyor belt a distance equal to the desired thickness of the subsequently formed ground meat patty and said covering paper roll effecting the flattening or mashing of the ground meat portions into patties as the ground meat portions pass successively therebeneath, said covering paper roll supporting means comprising anti-friction rollers carried by the table for engagement with the said covering paper roll at opposite points along the bottom edge thereof, said covering paper roll being diminished in size and weight in the act of supplying a covering paper for the ground meat portions and subsequently formed ground meat patties, means vertically guiding said covering paper roll whereby its lowermost edge is in supporting engagement with the supporting anti-friction rollers, and means for compensating for the loss of weight in the covering paper roll in direct proportion to said covering paper roll weight loss comprising a pivotly mounted platform, an axle for the covering paper roll, tie means between the covering paper roll axle and free end of the platform whereby diminishing size in the paper roll causes oscillation of the platform, and a weight on said platform movable relative thereto between its pivot and free end for adding its weight to the covering paper roll weight as the same is diminished, said position of the weight along the platform being progressive whereby its effectiveness is increased as the covering paper roll weight decreases.

8. In a ground meat patty forming machine the combination of a supporting table, a conveyor belt on said table movable relative thereto, a ground meat patty underlying paper layer on said conveyor belt movable with said conveyor belt, a paper roll at the end of the table for supplying said underlying paper layer, means for placing quantities of ground meat, each ground meat quantity sufficient to provide a patty, on the underlying paper layer and spaced from one another to provide a spacing between the patties, a second paper roll upstanding from said table supplying a covering paper for each portion of ground meat and the patty formed therefrom, means associated with the table supporting the bottom edge of the covering paper roll above the underlying paper layer and conveyor belt a distance equal to the desired thickness of the subsequently formed ground meat patty and said covering paper roll effecting the flattening or mashing of the ground meat portions into patties as the ground meat portions pass successively therebeneath, said covering paper roll supporting means comprising anti-friction rollers carried by the table for engagement with the said covering paper roll at opposite points along the bottom edge thereof, said covering paper roll being diminished in size and weight in the act of supplying a covering paper for the ground meat portions and subsequently formed ground meat patties, means vertically guiding said covering paper roll whereby its lowermost edge is in supporting engagement with the supporting anti-friction rollers, and means for compensating for the loss of weight in the covering paper roll in direct proportion to said covering paper weight loss comprising a pivotly mounted platform, an axle for the covering paper roll, tie means between the covering paper roll axle and free end of the platform whereby diminishing size in the paper roll causes oscillation of the platform, a weight on said platform movable relative thereto between its pivot and free end for adding its weight to the covering paper roll weight as the same is diminished, said position of the weight along the platform being progressive whereby its effectiveness is decreased as the covering paper roll weight decreases and means for controlling the position of the weight relative to the platform.

9. In a ground meat patty forming machine the combination of a supporting table, a conveyor belt on said table movable relative thereto, a ground meat patty underlying paper layer on said conveyor belt movable with said conveyor belt, a paper roll at the end of the table for supplying said underlying paper layer, means for placing quantities of ground meat, each ground meat quantity sufficient to provide a patty, on the underlying paper layer and spaced from one another to provide a spacing between the patties, a second paper roll upstanding from said table supplying a covering paper for each portion of ground meat and the patty formed therefrom, means associated with the table supporting the bottom edge of the covering paper roll above the underlying paper layer and conveyor belt a distance equal to the desired thickness of the subsequently formed ground meat patty and said covering paper roll effecting the flattening or mashing of the ground meat portions into patties as the ground meat portions pass successively therebeneath, said covering paper roll supporting means comprising anti-friction rollers carried by the table for engagement with the said covering paper roll at opposite points along the bottom edge thereof, said covering paper roll being diminished in size and weight in the act of supplying a covering paper for the ground meat portions and subsequently formed ground meat patties, means vertically guiding said covering paper roll whereby its lowermost edge is in supporting engagement with the supporting anti-friction rollers, and means for compensating for the loss of weight in the covering paper roll in direct proportion to said covering paper weight loss comprising a pivotly mounted platform, an axle for the covering paper roll, tie means between the covering paper roll axle and free end of the platform whereby diminishing size in the paper roll causes oscillation of the platform, a weight on said platform movable relative thereto between its pivot and free end for adding its weight to the covering paper roll weight as the same is diminished, said position of the weight along the platform being progressive whereby its effectiveness is increased as the covering paper roll weight decreases, and means for controlling the position of the weight relative to the platform, comprising a spring.

10. In a ground meat patty forming machine the combination of a supporting table, a conveyor belt on the upper surface of said table, means connected with said conveyor belt for moving same relative to the table, a ground meat patty underlying paper layer on said conveyor belt movable with said conveyor belt and with said underlying paper layer terminating in a paper roll carried by the table adjacent one end thereof, means placing quantities of ground meat, each ground meat quantity sufficient to provide a patty, on the underlying paper layer with said ground meat quantities spaced from one another to have a space between adjacent ground meat quantities, a second paper roll, and means associated with the table for mounting the said second paper roll above the table to have its lowermost peripheral point at all times spaced above the table, underlying paper and conveyor belt a distance equal to the desired thickness of the subsequently formed ground meat patty and wherein said covering paper roll effects the mashing of the ground meat quantities into patties as the ground meat quantities successively pass therebeneath.

11. In a ground meat patty forming machine the combination of a supporting table, a conveyor belt on the upper surface of said table, means connected with said conveyor belt for moving same relative to the table, a ground meat patty underlying paper layer on said conveyor belt movable with said conveyor belt and with said underlying paper layer terminating in a paper roll carried by the table adjacent one end thereof, means placing quantities of ground meat, each ground meat quantity sufficient to provide a patty, on the underlying paper layer with said ground meat quantities spaced from one another to have a space between adjacent ground meat quantities, a second paper roll, means associated with the table for mounting the said second paper roll above the table to have its lowermost peripheral point at all times spaced above the table, underlying paper and conveyor belt a distance equal to the desired thickness of the subsequently formed ground meat patty and wherein said covering paper roll effects the mashing of the ground meat quantities into patties as the ground meat quantities successively pass therebeneath, and an auxiliary flattening drum carried by the table having its bottom edge upwardly spaced from the underlying paper layer, conveyor belt and supporting table a distance substantially equal to the patty thickness.

12. In a ground meat patty forming machine the combination of a supporting table, a conveyor belt on the upper surface of said table, means connected with said conveyor belt for moving same relative to the table, a ground meat patty underlying paper layer on said conveyor belt movable with said conveyor belt and with said underlying paper layer terminating in a paper roll carried by the table adjacent one end thereof, means placing quantities of ground meat, each ground meat quantity sufficient to provide a patty, on the underlying paper layer with said ground meat quantities spaced from one another to have a space between adjacent ground meat quantities, a second paper roll, and means associated with the table for mounting the said second paper roll above the table to have its lowermost peripheral point at all times spaced above the table, underlying paper and conveyor belt a distance equal to the desired thickness of the subsequently formed ground meat patty and wherein said covering paper roll effects the mashing of the ground meat quantities into patties as the ground meat quantities successively pass therebeneath, said covering paper roll mounting means including anti-friction rolls carried by the table for engagement with the periphery of said covering paper roll at points substantially at its said lowermost peripheral point.

13. In a ground meat patty forming machine the combination of a supporting table, a conveyor belt on the upper surface of said table, means connected with said conveyor belt for moving same relative to the table, a ground meat patty underlying paper layer on said conveyor belt movable with said conveyor belt and with said underlying paper layer terminating in a paper roll carried by the table adjacent one end thereof, means placing quantities of ground meat, each ground meat quantity sufficient to provide a patty, on the underlying paper layer with said ground meat quantities spaced from one another to have a space between adjacent ground meat quantities, a second paper roll, means associated with the table for mounting the said second paper roll above the table to have its lowermost peripheral point at all times spaced above the table, underlying paper and conveyor belt a distance equal to the desired thickness of the subsequently formed ground meat patty and wherein said covering paper roll effects the mashing of the ground meat quantities into patties as the ground meat quantities successively pass therebeneath, said covering paper roll being diminished in size in the act of supplying a covering paper for the ground meat portions, and said covering paper roll mounting means including anti-friction rollers carried by the table for engagement with the periphery of said covering paper roll at points substantially at its said lowermost peripheral point, and said paper roll mounting means further including means vertically guiding said covering paper roll whereby its lowermost edge is at all times in engagement with the anti-friction rollers.

14. In a ground meat patty forming machine the combination of a supporting table, a conveyor belt on the upper surface of said table, means connected with said conveyor belt for moving same relative to the table, a ground meat patty underlying paper layer on said conveyor belt movable with said conveyor belt and with said underlying paper layer terminating in a paper roll carried by the table adjacent one end thereof, means placing quantities of ground meat, each ground meat quantity sufficient to provide a patty, on the underlying paper layer with said ground meat quantities spaced from one another to have a space between adjacent ground meat quantities, a second paper roll, means associated with the table for mounting the said second paper roll above the table to have its lowermost peripheral point at all times spaced above the table, underlying paper and conveyor belt a distance equal to the desired thickness of the subsequently formed ground meat patty and wherein said covering paper roll effects the mashing of the ground meat quantities into patties as the ground meat quantities successively pass therebeneath, said covering paper roll being diminished in size in the act of supplying a covering paper for the ground meat portions, said covering paper roll mounting means including anti-friction rollers carried by the table for engagement with the periphery of said covering paper roll at points substantially at its said lowermost peripheral point, said paper roll mounting means further including means vertically guiding said covering paper roll whereby its lowermost edge is at all times in engagement with the anti-friction rollers, and an auxiliary masher drum forwardly of the covering paper roll having its lowermost edge upwardly spaced from the underlying paper layer, conveyor belt and table a distance substantially equal to the thickness of the ground meat patty.

15. In a ground meat patty forming machine the combination of a supporting table, a conveyor belt on the upper surface of said table, means connected with said conveyor belt for moving same relative to the table, a ground meat patty underlying paper layer on said conveyor belt movable with said conveyor belt and with said underlying paper layer terminating in a paper roll carried by the table adjacent one end thereof, means placing quantities of ground meat, each ground meat quantity sufficient to provide a patty, on the underlying paper layer with said ground meat quantities spaced from one another to have a space between adjacent ground meat quantities, a second paper roll, and means associated with the table for mounting the said second paper roll above the table to have its lowermost peripheral point at all times spaced above the table, underlying paper and conveyor belt a distance equal to the desired thickness of the subsequently formed ground meat patty and wherein said covering paper roll effects the mashing of the ground meat quantities into patties as the ground meat quantities successively pass therebeneath, and means carried by the table for severing the covering and underlying paper layers through the spacing between adjacent ground meat patties.

16. In a ground meat patty forming machine the combination of a supporting table, a conveyor belt on the upper surface of said table, means connected with said conveyor belt for moving same relative to the table, a ground meat patty underlying paper layer on said conveyor belt movable with said conveyor belt and with said underlying paper layer terminating in a paper roll carried by the table adjacent one end thereof, means placing quantities of ground meat, each ground meat quantity sufficient to provide a patty, on the underlying paper layer with said ground meat quantities spaced from one another to have a space between adjacent ground meat quantities, a second paper roll, means associated with the table for mounting the said second paper roll above the table to have its lowermost peripheral point at all times spaced above the table, underlying paper and conveyor belt a distance equal to the desired thickness of the subsequently formed ground meat patty and wherein said covering paper roll effects the mashing of the ground meat quantities into patties as the ground meat quantities successively pass therebeneath, means carried by the table for severing the covering and underlying paper layers through the spacing between adjacent ground meat patties, comprising a movable knife blade pivotly mounted at the forward end of the table, and a fixed knife blade carried by the table relative to which the pivoted blade moves.

17. In a ground meat patty forming machine the combination of a supporting table, a conveyor belt on the upper surface of said table, means connected with said conveyor belt for moving same relative to the table, a ground meat patty underlying paper layer on said conveyor belt movable with said conveyor belt and with said underlying paper layer terminating in a paper roll carried by the table adjacent one end thereof, means placing quantities of ground meat, each ground meat quantity sufficient to provide a patty, on the underlying paper layer with said ground meat quantities spaced from one another to have a space between adjacent ground meat quantities, a second paper roll, means associated with the table for mounting the said second paper roll above the table to have its lowermost peripheral point at all times spaced above the table, underlying paper and conveyor belt a distance equal to the desired thickness of the subsequently formed ground meat patty and wherein said covering paper roll effects the mashing of the ground meat quantities into patties as the ground meat quantities successively pass therebeneath, means carried by the table for severing the covering and underlying paper layers through the spacing between adjacent ground meat patties, comprising a movable knife blade pivotly mounted at the forward end of the table, a fixed knife blade carried by the table relative to which the pivoted blade moves, and means for automatically actuating said movable knife blade relative to its fixed blade.

18. In a ground meat patty forming machine the combination of a supporting table, a conveyor belt on the upper surface of said table, means connected with said conveyor belt for moving same relative to the table, a ground meat patty underlying paper layer on said conveyor belt movable with said conveyor belt and with said underlying paper layer terminating in a paper roll carried by the table adjacent one end thereof, means placing quantities of ground meat, each ground meat quantity sufficient to provide a patty, on the underlying paper layer with said ground meat quantities spaced from one another to have a space between adjacent ground meat quantities, a second paper roll, means associated with the table for mounting the said second paper roll above the table to have its lowermost peripheral point at all times spaced above the table, underlying paper and conveyor belt a distance equal to the desired thickness of the subsequently formed ground meat patty and wherein said covering paper roll effects the mashing of the ground meat quantities into patties as the ground meat quantities successively pass therebeneath, means carried by the table for severing the covering and underlying paper layers through the spacing between adjacent ground meat patties, comprising a movable knife blade pivotly mounted at the forward end of the table, a fixed knife blade carried by the table relative to which the pivoted blade moves, said movable knife blade being oscillatable from an upper position to a lower position and movable from its upper position to its lower position by gravity, and means for positioning the knife blade in its upper position and automatically releasing same for effecting the severance of the underlying and covering paper layers.

19. In a ground meat patty forming machine the combination of a supporting table, a conveyor belt on the upper surface of said table, means connected with said conveyor belt for moving same relative to the table, a ground meat patty underlying paper layer on said conveyor belt movable with said conveyor belt and with said underlying paper layer terminating in a paper roll carried by the table adjacent one end thereof, means placing quantities of ground meat, each ground meat quantity sufficient to provide a patty, on the underlying paper layer with said ground meat quantities spaced from one another to have a space between adjacent ground meat quantities, a second paper roll, means associated with the table for mounting the said second paper roll above the table to have its lowermost peripheral point at all times spaced above the table, underlying paper and conveyor belt a distance equal to the desired thickness of the subsequently formed ground meat patty and wherein said covering paper roll effects the mashing of the ground meat quantities into patties as the ground meat quantities successively pass therebeneath, means carried by the table for severing the covering and underlying paper layers through the spacing between adjacent ground meat patties, comprising a movable knife blade pivotly mounted at the forward end of the table, a fixed knife blade carried by the table relative to which the pivoted blade moves, said movable knife blade being oscillatable from an upper position to a lower position and movable from its upper position to its lower position by gravity, and means for positioning the knife blade in its upper position and automatically releasing same for effecting the severance of the underlying and covering paper layers, including a cam rotatable for actuating the knife blade from its lower position to its upper position and automatically releasing it in its upper position.

20. In a ground meat patty forming machine the combination of a supporting table, a conveyor belt on the upper surface of said table, means connected with said conveyor belt for moving same relative to the table, a ground meat patty underlying paper layer on said conveyor belt movable with said conveyor belt and with said underlying paper layer terminating in a paper roll carried by the table adjacent one end thereof, means placing quantities of ground meat, each ground meat quantity sufficient to provide a patty, on the underlying paper layer with said ground meat quantities spaced from one another to have a space between adjacent ground meat quantities, a second paper roll, means associated with the table for mounting the said second paper roll above the table to have its lowermost peripheral point at all times spaced above the table, underlying paper and conveyor belt a distance equal to the desired thickness of the subsequently formed ground meat patty and wherein said covering paper roll effects the mashing of the ground meat quantities into patties as the ground meat quantities successively pass therebeneath, means carried by the table for severing the covering and underlying paper layers through the spacing between adjacent ground meat patties, comprising a movable knife blade pivotly mounted at the forward end of the table, a fixed knife blade carried by the table relative to which the pivoted blade moves, said movable knife blade being oscillatable from an upper position to a lower position and movable from its upper position to its lower position by gravity, means for positioning the knife blade in its upper position and automatically releasing same for effecting the severance of the underlying and covering paper layers, and cushioning means at the lower position of the knife blade to yieldingly bring same to a stop.

FRANK S. ELSAESSER.

REFERENCES CITED

The following references are of record in the file of this patent:

UNITED STATES PATENTS

| Number | Name | Date |
|---|---|---|
| 490,950 | Dill | Jan. 31, 1893 |
| 1,353,634 | Crandell | Sept. 21, 1920 |
| 1,831,779 | MacDonald | Nov. 10, 1931 |
| 2,299,314 | Elesh et al. | Oct. 20, 1942 |
| 2,302,574 | Richardson et al. | Nov. 17, 1942 |
| 2,386,775 | Balzarini | Oct. 16, 1945 |